July 22, 1969  W. B. HUNTER  3,456,979
CAMPING VEHICLE WITH RETRACTABLE CONSOLE
Filed June 1, 1967  2 Sheets-Sheet 1
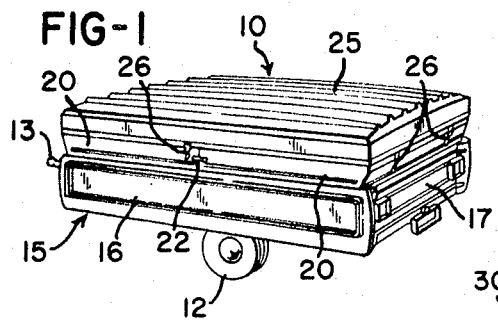
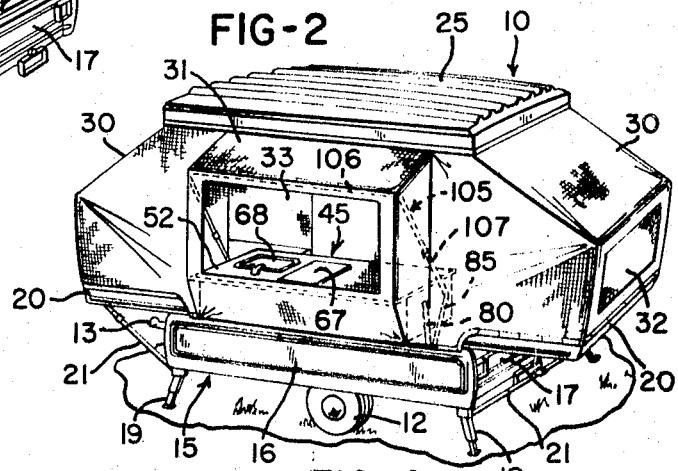
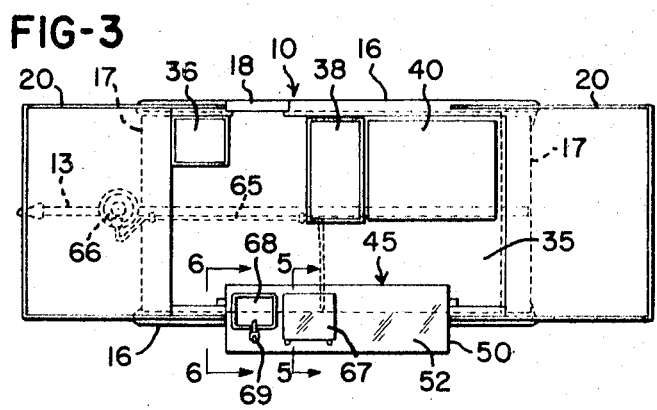
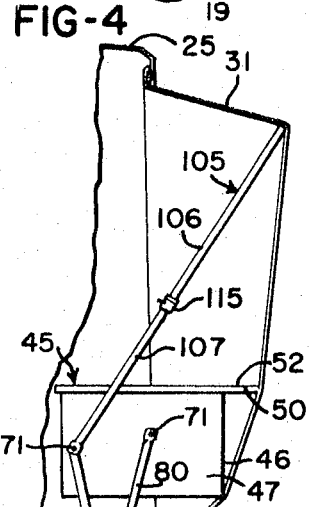
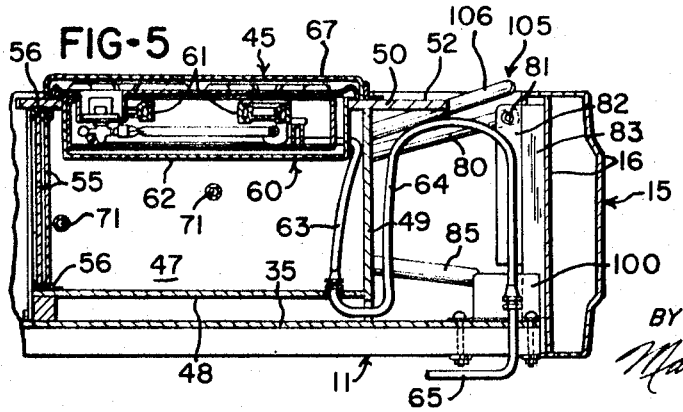
INVENTOR
WILLIAM B. HUNTER
BY
Mareckal, Biebel, French, Bugg
ATTORNEYS July 22, 1969   W. B. HUNTER   3,456,979
CAMPING VEHICLE WITH RETRACTABLE CONSOLE
Filed June 1, 1967   2 Sheets-Sheet 2
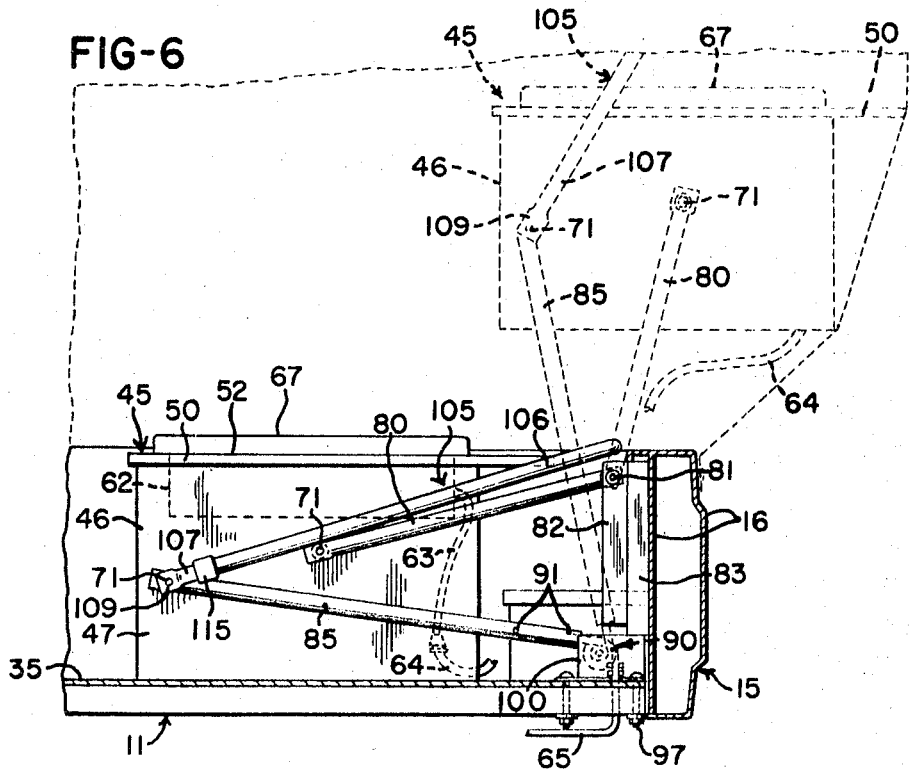
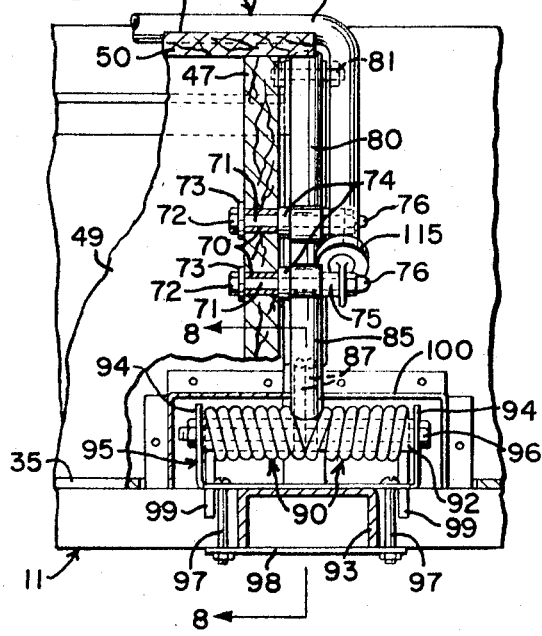
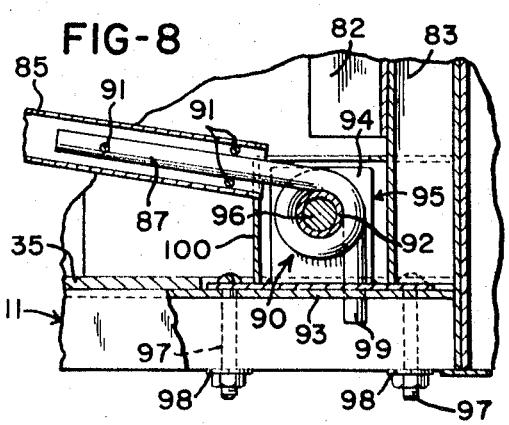

United States Patent Office 3,456,979
Patented July 22, 1969

3,456,979
CAMPING VEHICLE WITH RETRACTABLE CONSOLE
William B. Hunter, Hamilton, Ohio, assignor to Ward Manufacturing, Inc., Hamilton, Ohio, a corporation of Ohio
Filed June 1, 1967, Ser. No. 642,958
Int. Cl. B60p 3/32, 3/34
U.S. Cl. 296—23         12 Claims

ABSTRACT OF THE DISCLOSURE

A camping trailer including a body supporting a set of beds and a cover movable between collapsed and extended positions, in which an elongated utility console is supported at each end by a set of arms which are spring biased for conveniently moving the console between a retracted position within the body and an elevated position above the body after the beds and cover are extended.

Background of the invention

The field of this invention involves camping trailers of the type commonly employing a two-wheeled chassis supporting a generally rectangular shaped body. A pair of beds and some form of cover are mounted on the body for movement between retracted or collapsed positions for storing and towing the trailer and extended positions for providing an enclosed temporary living and sleeping area. Commonly, each bed is either hinged to the body and opens outwardly to rest on supporting braces or is slidably supported for movement horizontally between a retracted position over the body and an extended position projecting outwardly from the body.

The cover may comprise a substantially rigid rectangular top which serves as a hard top for the trailer when the beds are retracted and is connected to the beds by U-shaped bows so that when the beds are extended, the top is simultaneously and automatically elevated or raised. The hard top is connected to the beds and body by a flexible material such as canvas which is extended over each bed by a bow to provide covered space above the beds. The cover may also be formed entirely of canvas and be erected either after or while the beds are extended by uprighting retractable bows.

Such camping trailers have been provided with utility consoles, as for example, one which provides a usable work surface or counter space and incorporates a gas stove and a sink. The consoles which have been used in the past have been constructed in small light weight sections so that each section may be lifted from a stored position adjacent the floor for collapsing the beds and cover, to an elevated position where the stove and sink are at a convenient level for use by a person standing on the floor. The raising of the console sections, however, requires a substantial lifting force and is somewhat awkward to perform.

Summary of the invention

The present invention is directed to a camping trailer as described above which incorporates an improved support for the utility console whereby a relatively large console, which provides substantial storage space and work surface, and which can be conveniently moved between a retracted position where it is held positively against the floor of the body and an elevated position above the body. In accordance with the invention, these features are provided by an elongated cabinet which includes a top providing a substantially large work surface. A stove and a sink are recessed within the top, and sliding doors are mounted at the front of the cabinet for access to a shelf extending the full length of the cabinet.

The console is supported at each end by a set of vertically spaced pivotable arms which are connected to the body in such manner as to maintain the top work surface substantially horizontal both when the console is retracted and when it is elevated. A pair of coil type torsion springs form a compact pivot connection between each lower support arm and the body and also bias the arms upwardly for counterbalancing substantially all of the weight of the console so that the console may be moved to its elevated position with a relatively light force. The arrangement of the support arms at each end of the console also provides an "overcenter" action which is effective to hold the console firmly against the trailer floor when the console is retracted, and in addition, supports the console in the elevated position so that the console does not occupy floor space and is capable of supporting a substantial load.

Brief description of the drawings

FIG. 1 is a perspective view of a camping trailer constructed in accordance with the invention and illustrating the trailer when it is collapsed;

FIG. 2 is a perspective view of the trailer shown in FIG. 1 when it is extended or set up and showing the utility console in its elevated position;

FIG. 3 is a plan view of the extended trailer shown in FIG. 2 with the top and canvas removed;

FIG. 4 is a fragmentary section through the extended trailer of FIG. 2 and showing the console and the covering tent portion in their respective elevated and extended positions;

FIG. 5 is a section of the console as taken generally along the line 5—5 of FIG. 3 and shown in a retracted position;

FIG. 6 is a fragmentary section of the trailer and an end view of the console taken generally on line 6—6 of FIG. 3 and illustrating both the retracted and elevated positions of the console;

FIG. 7 is a fragmentary elevational view of the support arms at one end of the console and with a portion broken away to show detailed construction;

FIG. 8 is an enlarged section taken generally along the line 8—8 of FIG. 7; and

FIG. 9 is a section of a one-way gripping device which is used on the bow shown in FIG. 4.

Description of a preferred embodiment

The camping trailer 10 in FIGS. 1 and 3 includes a chassis comprising a frame 11 (FIGS. 4–8) supported by a pair of wheels 12 and having an extending tow bar 13 adapted to be attached to a hitch mounted on a towing vehicle. A generally rectangular body 15 having outer and inner side walls 16 and end walls 17 is mounted on the frame 11 and is provided with a hinged door 18 (FIG. 3). Retractable jacks 19 are mounted on the lower corners of the body 15 and are adapted to be lowered and extended (FIG. 2) for stabilizing the body after the trailer is parked at a camping site.

A pair of beds 20 are slidably mounted on the body 15 and are movable horizontally between retracted positions (FIG. 1) and extended positions (FIG. 2) where the beds are provided with braces 21. The beds 20 are fastened together when they are retracted by a pair of toggle clamps 22 located on opposite sides of the trailer.

A top 25 having a rectangular configuration substantially the same as the body 15 and preferably formed from rigid plastic extends over the beds 20 when they are retracted as shown in FIG. 1. The top 25 is secured to the retracted beds 20 by a series of toggle clamps 26 having a construction similar to the clamps 22. When the clamps 22 and 26 are released and the beds are moved towards their extended positions, the top 25 is elevated automatically by a pair of U-shaped bows (not shown) which are mounted on opposite ends of the top and are pivotally connected to the inner ends of the beds in a manner such as shown in copending application Ser. No. 537,504, filed Mar. 25, 1966 and assigned to the assignee of the present invention.

Canvas extends from the outer periphery of the top 25 to the body 15 and beds 20 and is supported outwardly over the beds by bows (not shown) to form corresponding tent portions 30. The canvas is also supported outwardly between the left outer side wall 16 of the body and the top 25 to form a tent portion 31. Windows 32 and 33 are formed within the tent portions 30 and 31, respectively, and are covered by a fabric netting. Referring to FIGS. 3–8, the trailer body 15 is provided with a floor 35 which is secured to the frame 11 and supports an ice chest 36, a cushion seat 38 and a table 40 which are arranged adjacent the right inner side wall 16 of the body.

An elongated utility console 45 having a rectangular configuration is positioned on the floor 35 (FIG. 6) between the seat 38 and table 40 and the left inner side wall 16 of the body. The console includes a wooden cabinet 46 having end walls 47 connected by a bottom shelf member 48, a rear wall 49 and a top 50 which provides a work surface 52. A series of sliding doors 55 are supported within tracks 56 mounted on the shelf member 48 and top 50 for access to the inside of the cabinet and articles supported by the shelf member 48.

Referring to FIG. 5, a gas stove 60 including a set of gas burners 61 within a metal casing 62 is recessed within an opening formed within the top 50 of the cabinet and is connected by a rigid line 63 and a flexible line 64 to a line 65 connected to a gas supply container 66 (FIG. 3) mounted on the tow bar 13 of the trailer. A sheet metal cover 67 extends over the burners 61 and is hinged at the back of the cabinet top 50 so that the cover can be raised to an upright position to protect the netting within the window 30 when the stove is in use. A sink 68 is also recessed within the top 50 and is provided with a combined faucet and pump 69 which supplies water from a suitable water container (not shown).

Referring to FIG. 7, a pair of tubular bushings 70 are inserted within each end wall 47 of the cabinet 46 and support corresponding bolts or pivot studs 71 each having a head 72 with an adjacent washer 73. A spacing washer 74 and bushing 75 are mounted on each stud and are retained thereon by a cap nut 76. As shown in FIGS. 4–6, the studs 71 are spaced primarily laterally of each other with the rear stud being located generally at the center of the end wall 47 and slightly above the front stud. Since the support for each end of the console 45 is substantially identical in construction and arrangement, the support for only one end is described in detail.

A square tubular upper arm 80 has one end portion mounted on the bushing 75 supported by the rear stud 71, and its opposite end portion is pivotally connected by a bolt 81 to a channel 82 mounted on a member 83 extending from the frame 11 and secured to the inner left side wall 16 of the body. A square tubular lower arm 85 has one end portion mounted on the bushing 75 supported by the front stud 71, and its opposite end portion receives adjacent end portions 87 (FIGS. 7 and 8) extending from a pair of torsion coil springs 90. The end portions 87 of the springs are rigidly retained within the arm 85 by cross pins 91 (FIG. 8). One of the pins extends through aligned holes formed in the arm and in the end portions 87 of the springs and the other two pins are spaced on opposite sides of the adjacent end portions.

The springs 90 are mounted on a tube 92 which extends between parallel spaced flanges 94 of an elongated U-shaped bracket 95 and is secured thereto by a bolt 96. The bracket 95 is rigidly mounted on a frame member 93 by two pairs of tie bolts 97 which extend through corresponding clamping plates 98. The opposite end portions 99 of the coil springs 90 extend downwardly through corresponding aligned holes formed within the U-shaped mounting bracket 95. A cover 100 extends over the pair of springs 90 and is provided with a slot for the support arm 85.

A tubular bow 105 (FIGS. 2 and 4) having U-shaped tubular portion 106 and telescopic tubular end portions 107 extend over the utility console 45 and is pivotally supported by bushings 75 mounted on the forward studs 71 and which extend through corresponding holes formed within flattened ends 109 of the end portions 107. A one-way gripping device 115 is mounted on each end of the U-shaped portion 106 of the bow 105 and automatically grips the corresponding end portion 107 when the U-shaped portion is extended.

Referring to FIG. 9, each gripping device 115 includes a tubular body portion 116 which receives the corresponding end of the U-shaped portion 106 of the bow. A tubular body portion 118 is secured to the body portion 116 and includes a flange 119 having a circular opening 120 for receiving the corresponding end portion 107 of the bow. The body portion 118 confines a plate member 122 which seats on a surface 123 formed on a projection 124 extending from the body portion 116. The plate member 122 includes a circular opening 125 which is slightly larger than the diameter of the end portion 107 and also includes a tab 126 which projects through an opening 127 formed within the body portion 118.

A compression spring 128 surrounds the end portion 107 of the bow and is confined by the body portion 118 so that the spring engages the plate 122 and tilts it on the surface 123 causing the plate to grip the end portion 107 of the bow and thereby prevent the end portion 107 from sliding further into the U-shaped portion 106 when a downward force is exerted on the bow. When it is desired to collapse the bow, each tab 126 is depressed to move the corresponding plate 122 towards a normal position relative to the axis of the end portion 107 of the bow and thereby releases the gripping engagement with the corresponding end portion 107 of the bow.

In operation, after the beds 20 are extended and the top 25 is raised, the console 45 is moved from its retracted position adjacent the floor 35 of the trailer as shown by the full lines in FIG. 6 to an elevated position simply by standing at one end of the console and applying a light lifting force on the rearwardly projecting lip of the cabinet top 50. This moves the rear studs 71 upwardly and "overcenter" through a plane extending through the front studs 71 and the bolts 81 and thereby unlocks the console so that the torsion springs 90 connected to the lower arms 85 on both ends of the console are effective to counterbalance the entire weight of the console. As a result the console is easily moved to its elevated position as shown in FIG. 4. After the console 45 is elevated, the bow 105 is extended for supporting the canvas to form the tent portion 31 along the left side of the trailer and thereby provide covered space above the console.

From the drawings and the above description, it can be seen that a camping trailer having a utility console constructed and supported in accordance with the invention provides several desirable features and advantages. For example, the use of the pair of torsion coil springs 90 for each end of the console 45 not only provides a compact pivot connection between the lower support arms 85 and the body 15, but also provides substantial torque on the arms 85 which is sufficient to counterbalance the entire weight of the console so that the console may be easily moved to its elevated position without requiring any significant lifting force.

The arrangement of the support arms 80 and 85 and their connection to the console and body are also effective to lock the console against the floor 35 when the console is retracted and to retain the console in its elevated position so that it is capable of supporting a substantial load.

That is, when the console is in its retracted position, the console is prevented from bouncing on the floor 35 during traveling as a result of the slight "overcenter" position of the rear studs 71 in relation to a plane defined by the front studs 71 and the bolts 81 connecting the upper support arms 80 to the body. On the other hand, when the console is in its elevated position, the lower support arms 85 are generally upright, and the upper support arms 80 rotate over a top center position or through a vertical plane extending through the bolts 81 so that a downward force on the console does not tend to collapse the console to its retracted position. Instead, a forward pulling force is required on the console to move it to its retracted position.

While the form of apparatus herein described constitutes a preferred embodiment of the invention, it is to be understood that the invention is not limited to this precise form of apparatus, and that changes may be made therein without departing from the scope of the invention.

What is claimed is:

1. A camping trailer or vehicle, comprising a body including a floor bordered by a generally vertical wall, a set of beds mounted on said body, cover means for said beds and said body, means for moving said beds and said cover means between collapsed and extended positions, an elongated utility console including a top work surface, a set of support arms of different lengths, a plurality of generally vertically spaced pivot members connecting said arms to said body, a plurality of generally horizontally spaced pivot members connecting said support arms to said console, and said pivot members and said support arms being arranged to effect movement of said console along a predetermined path between a retracted position within said body with said surface substantially parallel to said floor and an elevated position with said surface projecting horizontally above said wall.

2. A camping trailer as defined in claim 1 including spring means connected to at least one of said support arms, and means supporting said spring means for biasing said support arm in the direction to move said console to said elevated position to aid in counterbalancing the weight of said console and thereby to facilitate moving said console to said elevated position.

3. A camping trailer as defined in claim 2 wherein said spring means comprises at least one torsion coil spring for at least one support arm, said coil spring having an extending end portion connected to said support arm, and means mounted on said body for retaining said spring causing said spring to provide a compact pivot connection between said support arm and said body in addition to said biasing of said support arm.

4. A camping trailer as defined in claim 3 and including a pair of said coil springs for said one support arm, said pair of springs having adjacent said end portions, said one support arm having a tubular end portion receiving the adjacent said end portions of said springs, said retaining means including a U-shaped bracket for said pair of springs, and means extending through said pair of springs and secured to said bracket.

5. A camping trailer as defined in claim 1 wherein said pivot members are disposed to effect overcenter movement of at least one of said pivot members on said console through a vertical plane extending through one of said pivot members on said body when said console is moved from said retracted position to said elevated position so that said console is capable of supporting a substantial load without collapsing.

6. A camping trailer as defined in claim 2 wherein one of said pivot members on said console is disposed below a plane defined by the other said pivot member on said console and one of said pivot members on said body when said console is in said retracted position to effect overcenter locking of said console in said retracted position.

7. A camping trailer or vehicle, comprising a body, a set of beds mounted on said body, cover means for said beds and said body, means for moving said beds and said cover means between collapsed and extended positions, a utility console including a top working surface and a shelf spaced under said surface, a plurality of support arms pivotally connected to said body, pivot means connecting said support arms to said console for movement of said console between a retracted position within said body when said beds and cover means are collapsed and an elevated position for convenient use of said console, generally vertically extending door means mounted on said console for access to said shelf when said console is in said elevated position, spring means connected to at least two of said support arms, and means supporting said spring means for biasing the two said support arms in the direction to move said console to said elevated position to aid in counterbalancing the weight of said console and thereby to facilitate moving said console to said elevated position.

8. A camping trailer or vehicle, comprising a body, a set of beds mounted on said body, cover means for said beds and said body, means for moving said beds and said cover means between collapsed and extended positions, a utility console, a plurality of support arms pivotally connected to said body, pivot means connecting said support arms to said console for movement of said console between a retracted position within said body when said beds and cover means are collapsed and an elevated position for convenient use of said console, a U-shaped bow having telescopic end portions pivotally connected to said console, said cover means including flexible tent-like means extending over said bow, means for extending said bow to provide covered space above said console in said elevated position, spring means connected to at least two of said support arms, and means supporting said spring means for biasing the two said support arms in the direction to move said console to said elevated position to counterbalance the weight of said console and thereby to facilitate moving said console to said elevated position.

9. A camping trailer as defined in claim 8 wherein said means for extending said bow comprise a one-way gripping device for each said telescopic end portion of said bow, each said device including a tubular body mounted on the said bow, a movable plate retained by said body and having means defining an opening therein for receiving the corresponding said end portion of said bow, a compression spring retained by said body and biasing said plate towards a canted position for gripping said end portion, and means for tilting said plate against the bias of said spring for releasing said end portion of said bow.

10. A camping trailer or vehicle, comprising a body, a set of beds mounted on said body, cover means for said beds and said body, means for moving said beds and said cover means between collapsed and extended positions, an elongated utility console having opposite end portions and including a top member having a work surface, a plurality of support arms for each said end portion of said console, pivot means connecting said support arms to said body and to said end portions of said console for movement of said console between a retracted position within said body with said work surface extending generally horizontally and an elevated position for convenient use of said console, and said pivot means and said support arms being arranged to effect substantial overcenter movement of at least one of said support arms through a vertical plane extending through the pivot axis of said arm when said console is moved from said retracted position to said elevated position for retaining said console in said elevated position so that said console is capable of supporting a substantial load in said elevated position without collapsing.

11. A camping trailer as defined in claim 10 wherein said pivot means include first and second pivot members mounted on each said end portion of said console in laterally spaced relation, a first said support arm connected to said first pivot member and a second said support arm connected to said second pivot member, said pivot means on said body being arranged to support said second support arm above said first support arm and to effect movement of said second pivot member through a vertical plane extending through said pivot means on said body for said second support arm when said console is moved from said retracted position to said elevated position.

12. A camping trailer as defined in claim 10 including spring means connected to at least one of said arms on each said end portion of said console for biasing said arm in a direction to move said console to said elevated position, and means for retaining said console in said retracted position to prevent bouncing of said console relative to said body.

References Cited

UNITED STATES PATENTS

| | | | |
|---|---|---|---|
| 3,371,954 | 3/1968 | Larsson | 296—23 |
| 3,347,591 | 10/1967 | Soroos | 296—23 |
| 3,288,520 | 11/1966 | Krutzikowsky | 52—66 |
| 3,224,827 | 12/1965 | Foster | 312—266 |
| 2,161,323 | 6/1939 | Stephenson | 312—266 |

PHILIP GOODMAN, Primary Examiner

U.S. Cl. X.R.

52—66